US012378976B2

(12) United States Patent
Hamasaki

(10) Patent No.: US 12,378,976 B2
(45) Date of Patent: Aug. 5, 2025

(54) HYDRAULIC SYSTEM

(71) Applicant: Kubota Corporation, Osaka (JP)

(72) Inventor: Yohei Hamasaki, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 18/844,533

(22) PCT Filed: Feb. 20, 2023

(86) PCT No.: PCT/JP2023/005993
§ 371 (c)(1),
(2) Date: Sep. 6, 2024

(87) PCT Pub. No.: WO2023/176318
PCT Pub. Date: Sep. 21, 2023

(65) Prior Publication Data

US 2025/0198429 A1 Jun. 19, 2025

(30) Foreign Application Priority Data

Mar. 15, 2022 (JP) ................................ 2022-040540

(51) Int. Cl.
*F15B 11/16* (2006.01)
*F15B 11/028* (2006.01)

(52) U.S. Cl.
CPC .......... *F15B 11/161* (2013.01); *F15B 11/028* (2013.01); *F15B 2211/25* (2013.01); *F15B 2211/605* (2013.01); *F15B 2211/6653* (2013.01)

(58) Field of Classification Search
CPC .... F15B 11/05; F15B 11/161; F15B 2211/605
See application file for complete search history.

(56) References Cited

U.S. PATENT DOCUMENTS 4,154,262 A * 5/1979 Blume ................ F15B 13/0417 91/464
5,333,449 A * 8/1994 Takahashi ............. E02F 9/2296 91/461
5,433,076 A * 7/1995 Sugiyama ........... F15B 13/0417 60/426
5,699,665 A * 12/1997 Coolidge .............. E02F 9/2225 60/426
5,806,312 A 9/1998 Kauss et al.
11,143,211 B1 * 10/2021 Pintore ................. F15B 21/001

FOREIGN PATENT DOCUMENTS

JP 9317702 A 12/1997

* cited by examiner

*Primary Examiner* — Thomas E Lazo
(74) *Attorney, Agent, or Firm* — The Webb Law Firm

(57) ABSTRACT

The hydraulic system includes a pump operating unit configured to control the discharge amount of a hydraulic pump by receiving a pilot hydraulic fluid portion from a sensing oil passage. The sensing oil passage includes an operating valve switchable between an open state allowing the sensing oil passage to be open and a closed state blocking the pilot hydraulic fluid portion from flowing toward a control valve in the sensing oil passage The operating valve is maintained in the open state while an operation pressure is less than a setting pressure, the operation pressure being a pressure of the pilot hydraulic fluid portion in a portion of the sensing oil passage between the operating valve and the control valve, and the operating valve is switched to the closed state in response to increasing of the operation pressure to the setting pressure or more.

6 Claims, 4 Drawing Sheets

HYDRAULIC SYSTEM

CROSS-REFERENCE TO RELATED APPLICATIONS

This application is the United States national phase of International Patent Application No. PCT/JP2023/005993 filed Feb. 20, 2023, and claims priority to Japanese Patent Application No. 2022-040540 filed Mar. 15, 2022, the disclosures of which are hereby incorporated by reference in their entireties.

BACKGROUND OF THE INVENTION

Field of the Invention

The present invention relates to a configuration to control the discharge amount of a hydraulic pump in a hydraulic system configured to supply a hydraulic fluid from a variable displacement hydraulic pump to a hydraulic actuator.

Description of Related Art

As a conventional hydraulic system, there is a hydraulic system including: a variable displacement hydraulic pump; a control valve configured to supply a hydraulic fluid from the hydraulic pump to a hydraulic actuator; a sensing oil passage configured to extract a pilot hydraulic fluid branching from the hydraulic fluid supplied from the control valve to the hydraulic actuator; and a pump operating unit configured to control the discharge amount of the hydraulic pump by receiving the pilot hydraulic fluid from the sensing oil passage.

When the pressure of the pilot hydraulic fluid in the sensing oil passage increases, a load applied to the hydraulic actuator is considered to increase, and the discharge amount of the hydraulic pump is controlled to an increase side by the pump operating unit. When the pressure of the pilot hydraulic fluid in the sensing oil passage decreases, the load applied to the hydraulic actuator is considered to decrease, and the discharge amount of the hydraulic pump is controlled to a decrease side by the pump operating unit. This function is referred to as a load sensing function.

The load sensing function as described above is a feedback control to control the discharge amount of the hydraulic pump by transmitting a change in load to the pump operating unit, the load being applied to the hydraulic actuator. Hereby, in a case where the load applied to the hydraulic actuator frequently changes to high and low, for example, the discharge amount of the hydraulic pump may be frequently increased and decreased with a slight delay. This state is referred to as a hunting state.

In order to prevent the hunting state in the load sensing function, in the technology disclosed in Japanese Unexamined Patent Application Publication No. H09-317702 (see numerals 7, 11 and 12 in FIG. 1), a sensing oil passage includes a check valve, and a throttling section communicating with a tank is connected to the sensing oil passage.

In Japanese Unexamined Patent Application Publication No. H09-317702 (see numerals 7, 11 and 12 in FIG. 1), when a load applied to a hydraulic actuator increases, a pilot hydraulic fluid is supplied to a pump operating unit through the check valve, and the discharge amount of the hydraulic pump is controlled to an increase side by the pump operating unit. In a case where the load applied to the hydraulic actuator decreases subsequently, even when the pilot hydraulic fluid is to return from the pump operating unit to the tank through the sensing oil passage, the pilot hydraulic fluid is stopped by the check valve, so that the pilot hydraulic fluid slowly returns from the pump operating unit to the tank through the throttling section. Hereby, the pilot hydraulic fluid is easily retained in the pump operating unit, so that the discharge amount of the hydraulic pump is slowly controlled to a decrease side by the pump operating unit. Thus, a hunting phenomenon is prevented.

In the configuration of Japanese Unexamined Patent Application Publication No. H09-317702 (see numerals 7, 11 and 12 in FIG. 1), in a case where the load applied to the hydraulic actuator increases and then decreases, the pilot hydraulic fluid cannot pass through the check valve, but the pilot hydraulic fluid returns to the tank through the throttling section. Accordingly, the period during which the pilot hydraulic fluid is retained in the pump operating unit is not so long, and therefore, there is room for improvement in prevention of the hunting state.

In the above state, in order to extend the period during which the pilot hydraulic fluid is retained in the pump operating unit, the throttling section should be set to a very small diameter. However, it is necessary to perform high-precision machining to obtain the throttling section with a very small diameter, and it is difficult to obtain the throttling section with a very small diameter without variations at the time of mass production of the hydraulic system.

In the meantime, such a case is assumed, for example, that the control valve is operated to a neutral position to stop the hydraulic actuator after the load is applied to the hydraulic actuator. In this case, when the control valve is operated to the neutral position, it is necessary for the pilot hydraulic fluid to be discharged from the pump operating unit immediately.

In the configuration of Japanese Unexamined Patent Application Publication No. H09-317702 (see numerals 7, 11 and 12 in FIG. 1), the pilot hydraulic fluid passes through the throttling section and is discharged from the pump operating unit, it takes time for the pilot hydraulic fluid to be discharged from the pump operating unit. As a result, even after the control valve is operated to the neutral position, the discharge amount of the hydraulic pump is kept controlled to the increase side just for a predetermined period of time. In view of this, there is room for improvement in saving of the driving force of the hydraulic pump.

SUMMARY OF THE INVENTION

An object of the present invention is to prevent a hunting state, improve machining, and save the driving force of a hydraulic pump in a hydraulic system having a load sensing function.

A hydraulic system according to the present invention includes: a variable displacement hydraulic pump; a control valve configured to control a supply state of a hydraulic fluid from the hydraulic pump to a hydraulic actuator; a sensing oil passage configured to extract a pilot hydraulic fluid portion branching from the hydraulic fluid being supplied from the control valve to the hydraulic actuator; a pump operating unit configured to control a discharge amount of the hydraulic pump to an increase side in response to increasing of a pressure of the pilot hydraulic fluid portion in the sensing oil passage and to control the discharge amount of the hydraulic pump to a decrease side in response to decreasing of the pressure of the pilot hydraulic fluid portion in the sensing oil passage; and an operating valve provided in the sensing oil passage. The operating valve is switchable between an open state allowing the sensing oil passage to be open and a closed state blocking the pilot hydraulic fluid portion from flowing toward the control valve in the sensing oil passage. The operating valve is maintained in the open state while an operation pressure is less than a setting pressure, the operation pressure being the pressure of the pilot hydraulic fluid portion in a portion of the sensing oil passage which portion is between the operating valve and the control valve, and the operating valve is switched to the closed state in response to increasing of the operation pressure to the setting pressure or more.

In the present invention, when no load is applied to the hydraulic actuator, the operating valve is operated to the open state, so that the sensing oil passage is open.

When a load is applied to the hydraulic actuator, the pilot hydraulic fluid portion is supplied to the pump operating unit through the operating valve (the open state), and the discharge amount of the hydraulic pump is controlled to the increase side by the pump operating unit. When the load applied to the hydraulic actuator increases and the operation pressure as the pressure of the pilot hydraulic fluid portion in the portion of the sensing oil passage which portion is between the operating valve and the control valve increases, the operating valve is operated to the closed state.

In a case where the load applied to the hydraulic actuator decreases subsequently, even when the pilot hydraulic fluid portion is to return toward the control valve from the pump operating unit, the pilot hydraulic fluid portion is stopped by the operating valve (the closed state), so that the pilot hydraulic fluid portion is retained in the pump operating unit, and the discharge amount of the hydraulic pump is easily maintained on the increase side.

Hereby, even in a case where the load applied to the hydraulic actuator frequently changes to high and low, the discharge amount of the hydraulic pump is less frequently controlled to increase and decrease by the pump operating unit, so that a hunting state is prevented, thereby making it possible to stabilize the operation of the load sensing function.

For example, such a case is assumed that the control valve is operated to a neutral position from a state where the load is applied to the hydraulic actuator, and the hydraulic actuator is stopped.

With the present invention, when the control valve is operated to the neutral position to stop the hydraulic actuator, the operation pressure immediately decreases to operate the operating valve to the open state, so that the sensing oil passage is open.

This allows the pilot hydraulic fluid portion in the pump operating unit to immediately flow out through the operating valve (the open state), and the discharge amount of the hydraulic pump is controlled to the decrease side by the pump operating unit without delay. Accordingly, when the control valve is operated to the neutral position, the period during which the discharge amount of the hydraulic pump is maintained on the increase side can be shortened, thereby making it possible to save the driving force of the hydraulic pump.

In the present invention, a throttling section with a very small diameter which throttling section requires high-precision machining is unnecessary, and the operating valve having a relatively easy structure can achieve a function to prevent the hunting state and a function to shorten the period during which the discharge amount of the hydraulic pump is maintained on the increase side at the time when the control valve is operated to the neutral position. This makes it possible to achieve a simple structure and a low cost.

In the present invention, it is preferable that the closed state block the pilot hydraulic fluid portion from flowing toward the control valve and allow the pilot hydraulic fluid portion to flow toward the pump operating unit.

In the present invention, in a case where a load is applied to the hydraulic actuator, for example, when the operating valve is operated to the closed state until the pilot hydraulic fluid portion is sufficiently supplied to the pump operating unit, or when a further large load is applied to the hydraulic actuator after the operating valve is operated to the closed state, the pilot hydraulic fluid portion in the portion of the sensing oil passage between the operating valve and the control valve is supplied to the pump operating unit through the operating valve (the closed state), so that the discharge amount of the hydraulic pump is controlled to the increase side by the pump operating unit.

This hardly causes such a situation that the discharge amount of the hydraulic pump becomes insufficient relative to an increase in the load applied to the hydraulic actuator, thereby preventing a decrease in workability due to an insufficient discharge amount of the hydraulic pump.

In the present invention, it is preferable that: the operating valve include a spool movable between an open position causing the open state and a closed position causing the closed state, a biasing section configured to bias the spool to the open position, and a pressure receiving section configured to receive the operation pressure; the spool be maintained at the open position due to a biasing force of the biasing section while the operation pressure applied to the pressure receiving section is less than the setting pressure; and the spool be operated to the closed position against the biasing force of the biasing section in response to increasing of the operation pressure applied to the pressure receiving section to the setting pressure or more.

In the present invention, the hydraulic system of the present invention can be achieved by a simple configuration including the spool movable between the open position corresponding to the open state and the closed position corresponding to the closed state, and the biasing section configured to bias the spool to the open position.

In the present invention, it is preferable that: the operating valve include a first internal space, a second internal space connected to the first internal space, a first port allowing the first internal space to communicate with a portion of the sensing oil passage which portion is adjacent to the pump operating unit, a second port allowing the second internal space to communicate with a portion of the sensing oil passage which portion is adjacent to the control valve, the spool including a first land disposed on a side opposite from the second port across the first port, a second land disposed closer to the second port than the first port, and a notch provided in a peripheral end of the second land which peripheral end is adjacent to the first land, the spool being supported movably in the first internal space, a communication passage provided in the spool separately from the second land and the notch and allowing the first port to communicate with the second port, and a check valve configured to block the pilot hydraulic fluid portion from flowing from the first port to the second port in the communication passage and to allow the pilot hydraulic fluid portion to flow from the second port to the first port in the communication passage; the pressure receiving section ne a portion of the second land which portion faces the second internal space; the spool move due to the biasing force of the biasing section to the open position allowing the first port to communicate with the second port via the notch, in response to decreasing of the operation pressure applied to the pressure receiving section to be less than the setting pressure, with the first land and the second land being supported in the first internal space; and the spool move against the biasing force of the biasing section to the closed position causing the second land to block the communication between the first port and the second port via the notch, in response to increasing of the operation pressure applied to the pressure receiving section to the setting pressure or more, with the first land and the second land being supported in the first internal space.

In the present invention, when the operation pressure applied to the pressure receiving section of the spool decreases and the spool moves to the open position due to the biasing force of the biasing section, the notch of the spool is open to the second internal space, so that the first port and the second port communicate with each other via the notch of the spool, and the sensing oil passage is open.

In this case, since the first land and the second land separated from each other in the spool are supported in the first internal space, the spool is smoothly moved to the open position, and the spool is stably supported in the first internal space at the open position.

In the present invention, when the operation pressure applied to the pressure receiving section of the spool increases and the spool moves to the closed position due to the operation pressure, the notch of the spool is closed to the second internal space, so that the communication between the first port and the second port via the notch is blocked by the second land of the spool.

In this case, since the first land and the second land separated from each other in the spool are supported in the first internal space, the spool smoothly moves to the closed position, and the spool is stably supported in the first internal space at the closed position.

Even when the spool moves to the closed position, the communication passage and the check valve block the pilot hydraulic fluid portion from flowing from the first port to the second port (the control valve) in the communication passage and allow the pilot hydraulic fluid portion to flow from the second port to the first port (the pump operating unit) in the communication passage.

In the present invention, it is preferable that the hydraulic system include a stopper configured to, in response to the spool moving to the open position due to the biasing force of the biasing section, stop the spool at a position allowing the first port to communicate with the second port via the notch and maintaining the second land in the first internal space.

In the present invention, in a case where the spool moves to the open position due to the biasing force of the biasing section and the first port and the second port communicate with each other via the notch of the spool, the spool is stopped by the stopper at a position allowing the second land of the spool to remain in the first internal space, and the open position is a position where the spool is stopped by the stopper portion.

If the spool moves across the open position to cause the second land of the spool to leave the first internal space and enter the second internal space at the time when the spool moves to the open position by the biasing section, the second land may not be able to smoothly enter the first internal space from the second internal space at the time when the spool moves from the open position to the closed position. In contrast, the present invention can prevent such a situation.

In the present invention, it is preferable that the second internal space have a diameter larger than a diameter of the first internal space.

In the present invention, the second internal space has a diameter larger than that of the first internal space, and therefore, when the operation pressure is applied to the pressure receiving section of the spool, the operation pressure is easily uniformly applied to the pressure receiving section of the spool without any unbalance, so that the spool smoothly moves to the closed position.

DESCRIPTION OF THE INVENTION

Figure 1:
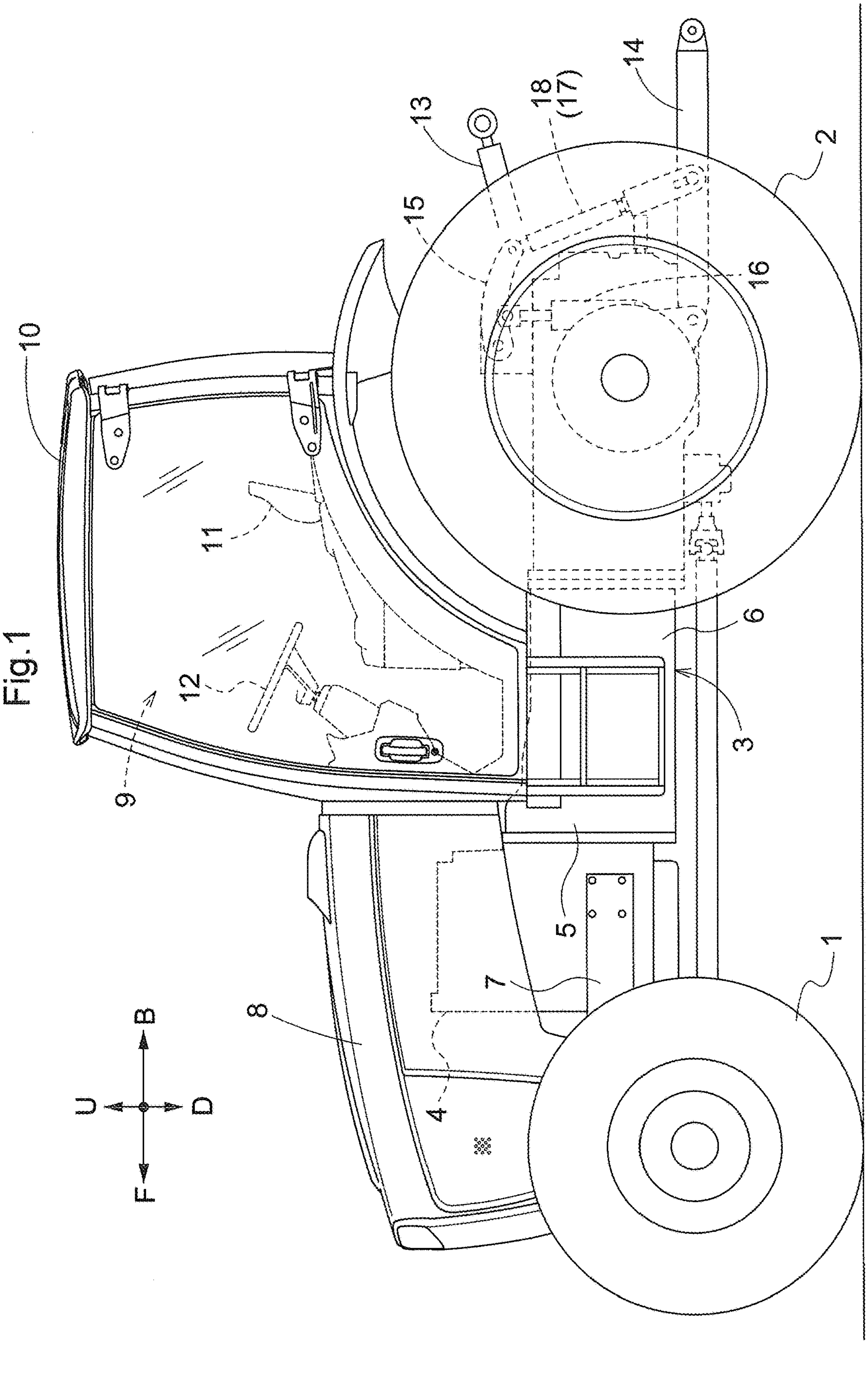
FIG. 1 is a left side view of a tractor.

FIGS. 1 to 5 illustrate a tractor as an example of a work vehicle including a hydraulic system according to one embodiment of the present invention. In FIG. 1, F indicates a front direction, B indicates a rear direction, U indicates an upper direction, and D indicates a lower direction.

(Overall Configuration of Tractor)

As illustrated in FIG. 1, a body 3 is supported on right and left front wheels 1 and right and left rear wheels 2. The body 3 includes an engine 4, a clutch housing 5 connected to a rear side of the engine 4, a transmission case 6 connected to a rear side of the clutch housing 5, a front frame 7 connected to a front side of the engine 4, and so on. The front wheels 1 are supported in the front frame 7, and the rear wheels 2 are supported on a rear side of the transmission case 6.

The body 3 includes a bonnet 8 on a front side of the body 3, and the engine 4 is covered with the bonnet 8. The body 3 includes a driving section 9 on a rear side of the body 3 such that the driving section 9 is covered with a cabin 10, and the driving section 9 includes a driver seat 11 and a control wheel 12 by which the front wheels 1 are steered.

(Configuration about Support for Work Device)

As illustrated in FIG. 1, one top link 13 and right and left lower links 14 are supported swingably in the up-down direction on the rear side of the transmission case 6, and a work device such as a rotary cultivating device (not illustrated) or a plow device (not illustrated) is connected to the top link 13 and the lower links 14.

Right and left lift arms 15 are supported swingably in the up-down direction on an upper rear side of the transmission case 6, and right and left lift cylinders 16 (corresponding to a hydraulic actuator) are connected to the right and left lift arms 15 and a lower rear side of the transmission case 6.

A rolling cylinder 17 is connected to the right lift arm 15 and the right lower link 14, and a connection rod 18 is connected to the left lift arm 15 and the left lower link 14.

The lower links 14 are lifted and lowered in response to lifting and lowering of the lift arms 15 by the lift cylinders 16, so that the work device is lifted and lowered. The right lower link 14 is lifted and lowered in response to expansion and contraction of the rolling cylinder 17, so that the work device rolls with the left lower link 14 as a fulcrum.

(Overview of Hydraulic Circuit)

Figure 2:
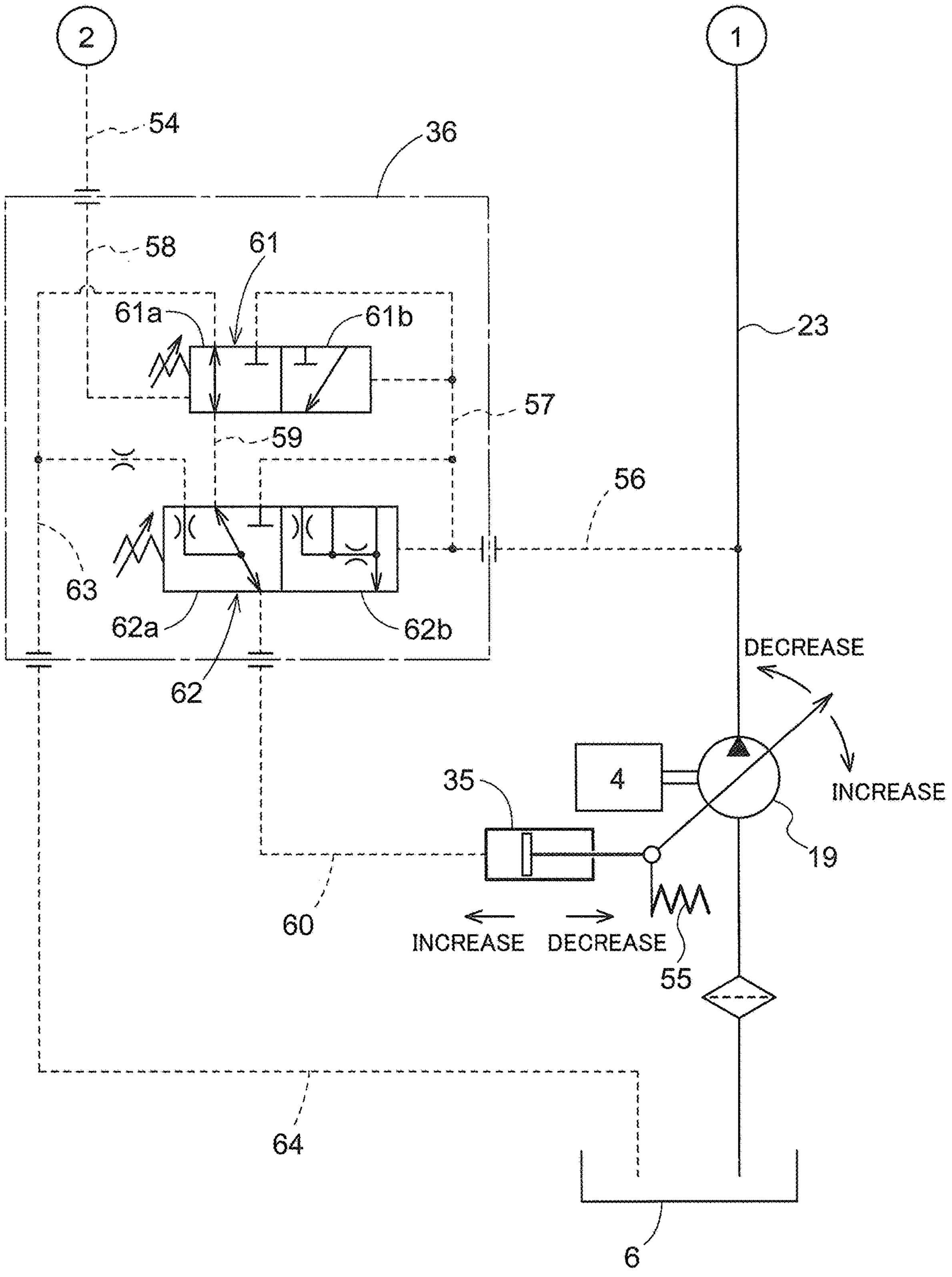
FIG. 2 is a hydraulic circuit diagram around a hydraulic pump and a pump operating unit.
Figure 3:
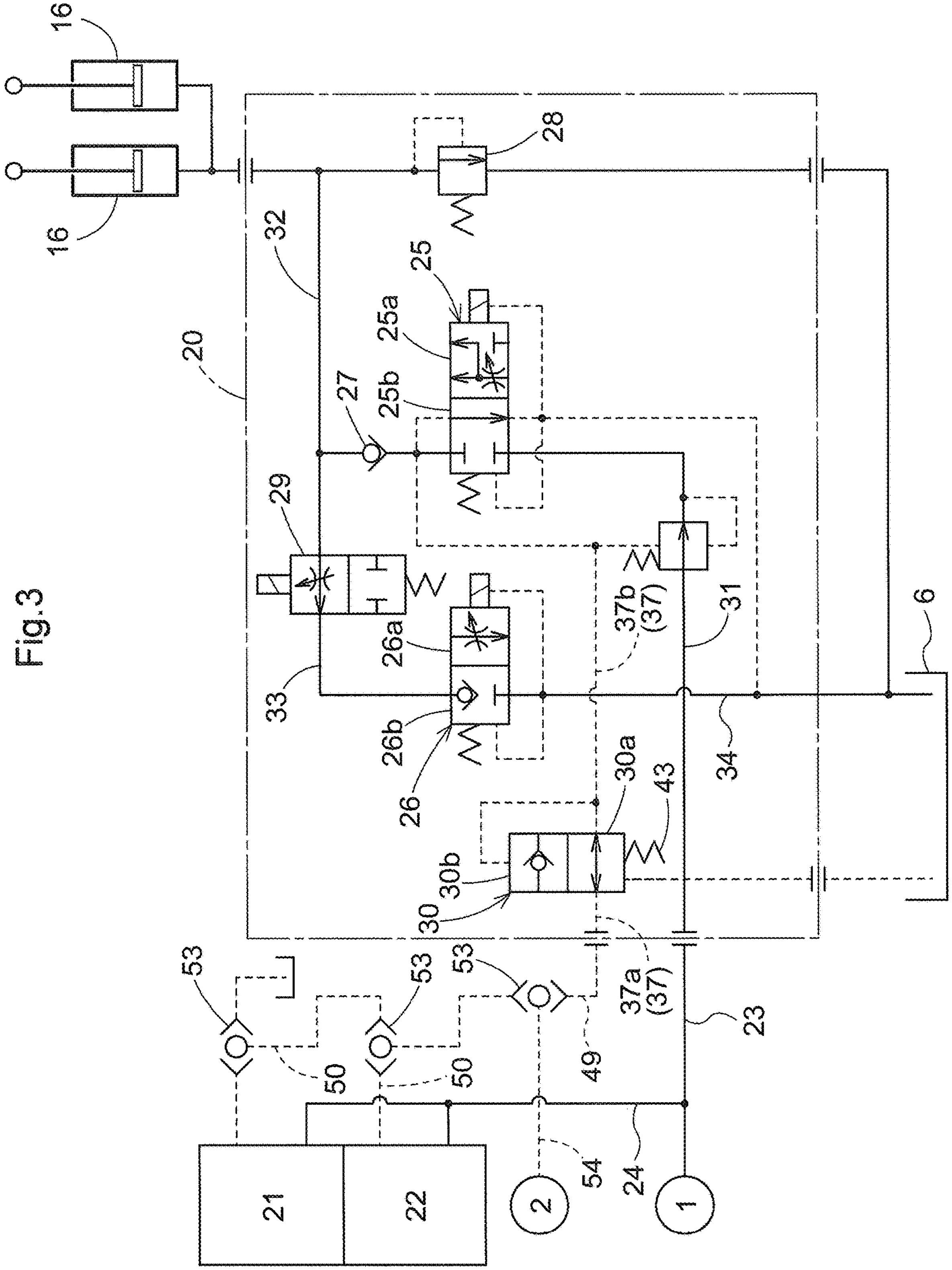
FIG. 3 is a hydraulic circuit diagram around a control valve unit.

As illustrated in FIGS. 2 and 3, a hydraulic pump 19 driven by the engine 4 is provided, and a lubricant accumulated in the transmission case 6 is sucked by the hydraulic pump 19 as a hydraulic fluid.

A control valve unit 20 configured to supply and discharge the hydraulic fluid to and from the lift cylinder 16, and hydraulic units 21, 22 configured to supply and discharge the hydraulic fluid to and from the work device (not illustrated) such as a front loader provided in the body 3 are provided.

An oil passage 23 of the hydraulic pump 19 is connected to the control valve unit 20, an oil passage 24 branching from the oil passage 23 is connected to the hydraulic units 21, 22, and the hydraulic fluid in the hydraulic pump 19 is supplied to the control valve unit 20 and the hydraulic units 21, 22.

The lift cylinder 16 is configured as an independent control cylinder. In the control valve unit 20, when the hydraulic fluid is supplied to the lift cylinder 16, the lift cylinder 16 expands, so that the lift arm 15 is lifted. When the hydraulic fluid is discharged from the lift cylinder 16, the lift cylinder 16 contracts, so that the lift arm 15 is lowered.

(Configuration of Control Valve Unit)

As illustrated in FIG. 3, the control valve unit 20 includes a lifting control valve 25 (corresponding to a control valve), a lowering control valve 26 (corresponding to a control valve), a check valve 27, a relief valve 28, an opening-closing valve 29, an operating valve 30, and so on.

As illustrated in FIGS. 2 and 3, the oil passage 23 from the hydraulic pump 19 is connected to an oil passage 31 in the control valve unit 20, and the lifting control valve 25 is connected to the oil passage 31. The lifting control valve 25 is a solenoid control valve having a lifting position 25*a* and a neutral position 25*b* and is biased by a spring toward the neutral position 25*b*. An oil passage 32 is connected to the lifting control valve 25 and the lift cylinder 16, the check valve 27 is provided in the oil passage 32, and the relief valve 28 is connected to the oil passage 32.

An oil passage 33 is connected to the oil passage 32, the opening-closing valve 29 is provided in the oil passage 33, and the oil passage 33 is connected to the lowering control valve 26. The opening-closing valve 29 has an open position having a variable throttling function and a closed position.

The lowering control valve 26 is configured as a solenoid control valve having a lowering position 26*a* having a variable throttling function and a neutral position 26*b* and is biased by a spring toward the neutral position 26*b*. An oil passage 34 from the lowering control valve 26 is connected to the transmission case 6.

FIG. 3 illustrates a state where the lifting control valve 25 and the lowering control valve 26 are operated to the neutral positions 25*b*, 26*b*, and the hydraulic fluid in the lift cylinder 16 is stopped by the lowering control valve 26 (at the neutral position 26*b*) and the check valve 27, so that the lift cylinder 16 is stopped.

When the lifting control valve 25 is operated to the lifting position 25*a* from the state illustrated in FIG. 3, the hydraulic fluid in the hydraulic pump 19 is supplied to the lift cylinder 16 via the oil passages 23, 31, the lifting control valve 25 (at the lifting position 25*a*), the check valve 27, and the oil passage 32, so that the lift cylinder 16 extends.

When the lowering control valve 26 is operated to the lowering position 26*a* from the state illustrated in FIG. 3, the hydraulic fluid in the lift cylinder 16 is discharged to the transmission case 6 via the oil passage 32, the opening-closing valve 29 (at the open position), the oil passage 33, the lowering control valve 26 (at the lowering position 26*a*), and the oil passage 34, so that the lift cylinder 16 contracts.

Thus, the supply state of the hydraulic fluid from the hydraulic pump 19 to the lift cylinder 16 is controlled by the lifting control valve 25 and the lowering control valve 26.

(Overview of Load Sensing Function)

As illustrated in FIG. 3, in the lift cylinder 16 to or from which the hydraulic fluid is supplied or discharged by the control valve unit 20 and the work device to or from which the hydraulic fluid is supplied or discharged by the hydraulic unit 21, 22, respective loads applied to the lift cylinder 16 and the work device are extracted as a pressure of the pilot hydraulic fluid. When the pressure of the pilot hydraulic fluid is high, the loads can be considered to be large, and when the pressure of the pilot hydraulic fluid is low, the loads can be considered to be small.

The pilot hydraulic fluid extracted by the control valve unit 20 is supplied to the oil passage 49, and the pilot hydraulic fluid extracted by the hydraulic unit 21, 22 is supplied to the oil passage 50. Among the pilot hydraulic fluids from the control valve unit 20 and the hydraulic units 21, 22, a pilot hydraulic fluid with the highest pressure is selected by a high-pressure selection valve 53 and is supplied to an oil passage 54.

As illustrated in FIG. 2, the hydraulic pump 19 is configured as a variable displacement pump and includes an operating cylinder 35 configured to control the discharge amount of the hydraulic pump 19 to an increase side or a decrease side, and a pump operating unit 36 configured to operate the operating cylinder 35.

The discharge amount of the hydraulic pump 19 is controlled by the pump operating unit 36 and the operating cylinder 35 based on the pilot hydraulic fluid with the highest pressure. When the pressure of the pilot hydraulic fluid with the highest pressure increases, the discharge amount of the hydraulic pump 19 is controlled to the increase side by the operating cylinder 35, and when the pressure of the pilot hydraulic fluid with the highest pressure decreases, the discharge amount of the hydraulic pump 19 is controlled to the decrease side by the operating cylinder 35.

(Overview of Operating Valve)

As illustrated in FIG. 3, in the control valve unit 20, a sensing oil passage 37 branches from between the lifting control valve 25 and the check valve 27 in the oil passage 32 and is connected to the oil passage 49. A pilot hydraulic fluid branches from the hydraulic fluid supplied from the lifting control valve 25 to the lift cylinder 16 and is extracted to the sensing oil passage 37.

Figure 4:
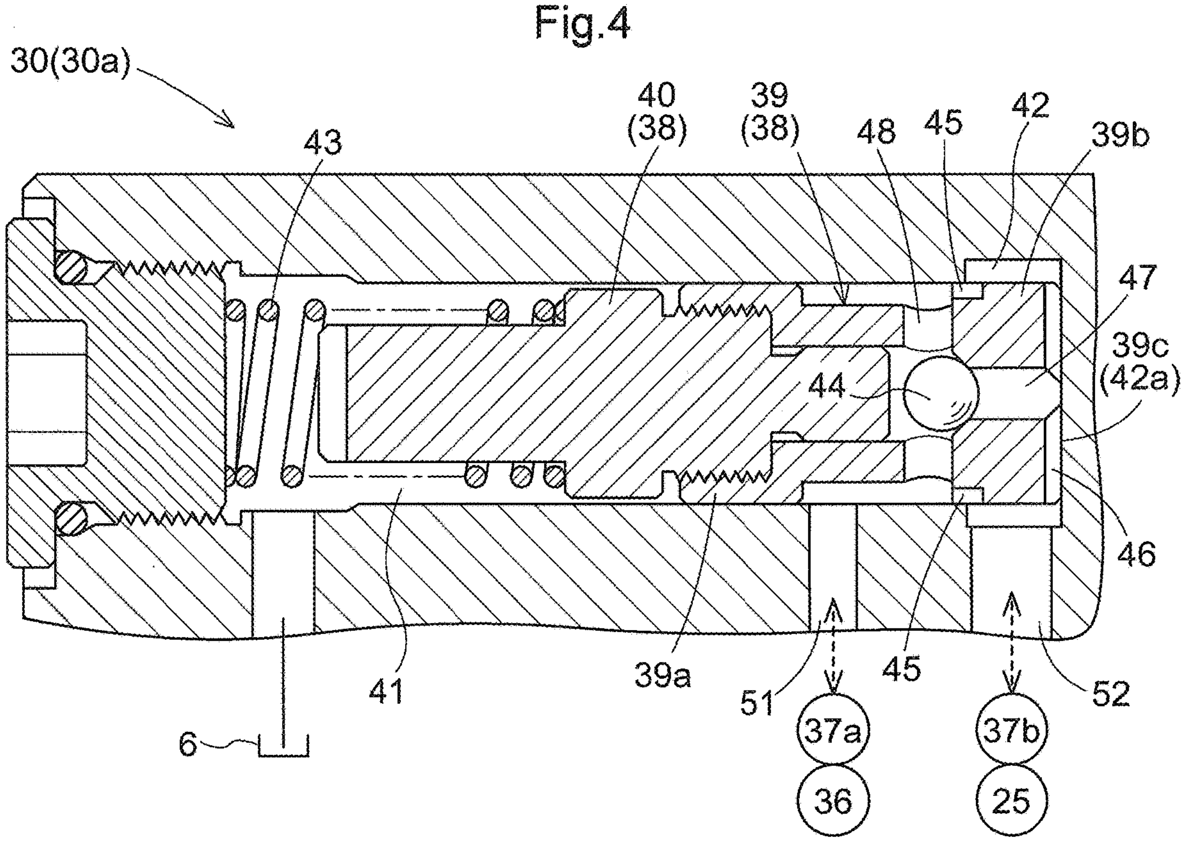
FIG. 4 is a sectional view of an operating valve operated to an open position.
Figure 5:
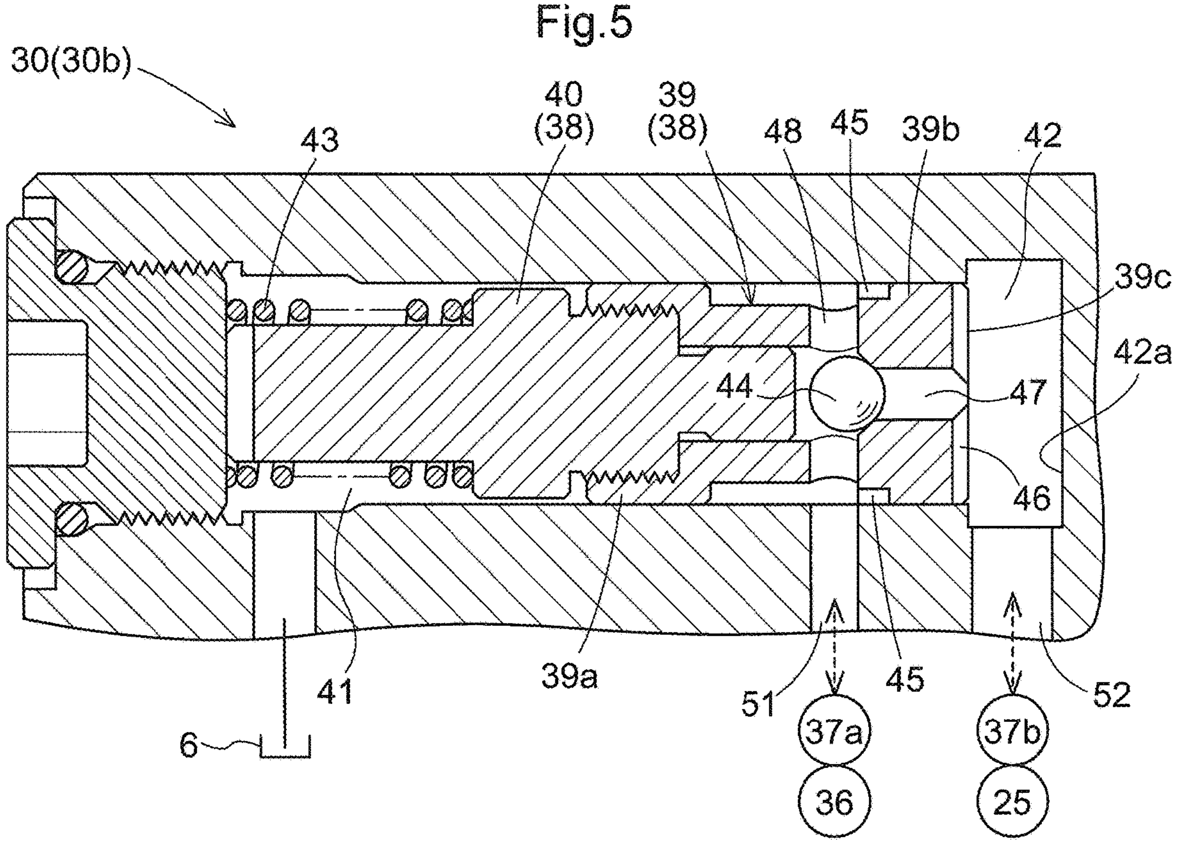
FIG. 5 is a sectional view of the operating valve operated to a closed position.

As illustrated in FIGS. 3, 4 and 5, the operating valve 30 is provided on the sensing oil passage 37. The operating valve 30 includes a first internal space 41, a second internal space 42, a spool 38, a spring 43 (corresponding to a biasing section), a check valve 44, a notch 45, a groove 46 (corresponding to a communication passage), communication passages 47, 48, a first port 51, a second port 52, and so on.

As illustrated in FIGS. 4 and 5, the first port 51 is connected to the first internal space 41, so that a portion 37*a* of the sensing oil passage 37 which portion 37*a* is closer to the pump operating unit 36 communicates with the first internal space 41 via the first port 51.

The second internal space 42 is connected to the first internal space 41 and is formed to have a diameter large than that of the first internal space 41. The second port 52 is connected to the second internal space 42, so that a portion 37*b* of the sensing oil passage 37 which portion 37*b* is closer to the lifting control valve 25 communicates with the second internal space 42 via the second port 52. The hydraulic units 21, 22 are also provided with similar operating valves 30.

As described above, the hydraulic system is constituted by the hydraulic pump 19, the lifting control valve 25, the lowering control valve 26, and the operating valve 30 of the control valve unit 20, the sensing oil passage 37, the pump operating unit 36, and so on.

(Configuration of Spool in Operating Valve)

As illustrated in FIGS. 4 and 5, the spool 38 includes a first portion 39 and a second portion 40, and the first portion 39 includes a first land 39*a* and a second land 39*b*.

The first land 39*a* of the spool 38 (the first portion 39) is disposed on a side opposite from the second port 52 across the first port 51. The second land 39*b* of the spool 38 (the first portion 39) is disposed closer to the second port 52 than the first port 51, and the first land 39*a* and the second land 39*b* of the spool 38 (the first portion 39) are disposed away from each other.

The first land 39*a* and the second land 39*b* of the spool 38 (the first portion 39) are supported on an inner surface of the first internal space 41, so that the spool 38 is movably supported in the first internal space 41. The spring 43 is attached to the second portion 40 of the spool 38 such that the spool 38 is biased by the spring 43 toward the second internal space 42.

In the second land 39*b* of the spool 38 (the first portion 39), a wall 39*c* (corresponding to a pressure receiving section) on a side opposite from the first land 39*a* faces the second internal space 42. The pressure (operation pressure) of the pilot hydraulic fluid in the portion 37*b* (the second port 52) of the sensing oil passage 37 between the operating valve 30 and the lifting control valve 25 is applied to the wall 39*c* of the spool 38 (the first portion 39).

The notch 45 is formed in an end of an outer periphery of the second land 39*b* of the spool 38 (the first portion 39) which end is closer to the first land 39*a*. Two notches 45 are formed such that the two notches 45 are disposed at respective positions separated from each other by 180 degrees.

The groove 46 is formed on the wall 39*c* of the second land 39*b* of the spool 38 (the first portion 39). The first portion 39 of the spool 38 includes one communication passage 48 passing through between the first land 39*a* and the second land 39*b*, and the communication passage 47 passing through the groove 46 and the communication passage 48 is formed. The check valve 44 having a ball-shape is disposed at an intersection between the communication passages 47, 48.

Hereby, the groove 46 and the communication passages 47, 48 are provided in the spool 38 (the first portion 39), so that the first port 51 communicates with the second port 52 separately from the second land 39*b* of the spool 38 (first portion 39) and the notch 45. The check valve 44 is provided in the spool 38 (the first portion 39) separately from the second land 39*b* of the spool 38 (the first portion 39) and the notch 45.

(State where Operating Valve is Operated to Open Position)

FIGS. 3 and 4 illustrate a state where no load is applied to the lift cylinder 16, the pressure (operation pressure) of the pilot hydraulic fluid in the portion 37*b* (the second port 52) of the sensing oil passage 37 is low, and the pressure (operation pressure) of the pilot hydraulic fluid received by the wall 39*c* of the spool 38 (the first portion 39) is low.

The operating valve 30 (the spool 38) is biased by the spring 43 to an open position 30*a* illustrated in FIG. 4. The spring 43 has a biasing force (corresponding to a setting pressure determined by the biasing force of the biasing section (the spring 43)) set to be small to such an extent that, while no load is applied to the lift cylinder 16, the biasing force overcomes a low pressure (operation pressure) of the pilot hydraulic fluid in the portion 37*b* (the second port 52) of the sensing oil passage 37.

Hereby, the spool 38 moves to the open position 30*a* due to the spring 43 to operate the operating valve 30 to the open position 30*a* while no load is applied to the lift cylinder 16.

While the operating valve 30 (the spool 38) is operated to the open position 30*a*, the notch 45 of the spool 38 is open to the second internal space 42, so that the first port 51 communicates with the second port 52 via the notch 45 of the spool 38, and the sensing oil passage 37 (the portions 37*a*, 37*b*) is open.

In this state, the operation pressure as the pressure of the pilot hydraulic fluid in the portion 37*b* of the sensing oil passage 37 between the operating valve 30 and the lifting control valve 25 is less than the setting pressure, so that the operating valve 30 is switched to an open state and maintained.

The wall 39*c* of the second land 39*b* of the spool 38 (the first portion 39) abuts with a wall 42*a* (corresponding to a stopper) of the second internal space 42, so that the spool 38 cannot move rightward in FIG. 4 across the open position 30*a* of the operating valve 30 as illustrated in FIG. 4.

Since the width of the second internal space 42 is set to be sufficiently smaller than the width of the first internal space 41, an end (a portion near the notch 45) of the second land 39*b* of the spool 38 (the first portion 39) which end is closer to the first land 39*a* is not separated from the first internal space 41 and is supported on the inner surface of the first internal space 41.

The check valve 44 allows the pilot hydraulic fluid to flow from the second port 52 to the first port 51 in the groove 46 and the communication passages 47, 48. The flow of the pilot hydraulic fluid from the first port 51 toward the second port 52 is blocked by the check valve 44.

With the above configuration, when the pressure (operation pressure) of the pilot hydraulic fluid received by the wall 39*c* of the spool 38 (the first portion 39) decreases, the spool 38 moves due to the biasing force of the spring 43 to the open position 30*a* of the operating valve 30 which open position 30*a* allows the first port 51 and the second port 52 to communicate with each other via the notch 45 of the spool 38 while the first land 39*a* and the second land 39*b* of the spool 38 (the first portion 39) are supported on the inner surface of the first internal space 41.

(State where Operating Valve is Operated to Closed Position)

FIG. 5 illustrates a state where a load is applied to the lift cylinder 16, the pressure (operation pressure) of the pilot hydraulic fluid in the portion 37*b* (the second port 52) of the sensing oil passage 37 is high, and the pressure (operation pressure) of the pilot hydraulic fluid received by the wall 39*c* of the spool 38 (the first portion 39) is high.

When the pressure (operation pressure) of the pilot hydraulic fluid received by the wall 39*c* of the spool 38 (the first portion 39) increases, the spool 38 moves leftward in FIG. 4 against the biasing force of the spring 43 (corresponding to the setting pressure determined by the biasing force of the biasing section (the spring 43)) due to the pressure (operation pressure) of the pilot hydraulic fluid received by the wall 39*c* of the spool 38 (the first portion 39), so that the operating valve 30 (the spool 38) is operated to the closed position 30*b* illustrated in FIG. 5.

As illustrated in FIGS. 3 and 5, when the operating valve 30 (the spool 38) is operated to the closed position 30*b*, the notch 45 of the spool 38 is closed to the second internal space 42, so that the communication between the first port 51 and the second port 52 via the notch 45 is blocked by the second land 39*b* of the spool 38 (the first portion 39).

Since the spool 38 (the first portion 39) is provided with the groove 46, the communication passages 47, 48, and the check valve 44, even when the operating valve 30 (the spool 38) is operated to the closed position 30*b*, the check valve 44 allows the pilot hydraulic fluid to flow from the second port 52 to the first port 51 in the groove 46 and the communication passages 47, 48. The flow of the pilot hydraulic fluid from the first port 51 toward the second port 52 is blocked by the check valve 44.

In this state, the operation pressure as the pressure of the pilot hydraulic fluid in the portion 37*b* of the sensing oil passage 37 between the operating valve 30 and the lifting control valve 25 is increases to the setting pressure or more, so that the operating valve 30 is switched to a closed state.

With the above configuration, when the pressure (operation pressure) of the pilot hydraulic fluid received by the wall 39*c* of the spool 38 (the first portion 39) increases, the spool 38 moves against the biasing force of the spring 43 to the closed position 30*b* of the operating valve 30 which closed position 30*b* causes the second land 39*b* of the spool 38 (the first portion 39) blocks the first port 51 from the second port 52 while the first land 39*a* and the second land 39*b* of the spool 38 (the first portion 39) are supported on the inner periphery of the first internal space 41.

As illustrated in FIGS. 2 and 3, when the operating valve 30 is at the closed position 30*b*, the flow of the pilot hydraulic fluid toward the lifting control valve 25 is blocked, and the flow of the pilot hydraulic fluid toward the pump operating unit 36 is allowed.

(Configuration of Pump Operating Unit)

As illustrated in FIG. 2, the operating cylinder 35 is biased by the spring 55 to an increase side, and the operating cylinder 35 is operated to a decrease side upon receipt of the hydraulic fluid supplied from the pump operating unit 36.

The pump operating unit 36 includes a first pump operating valve 61 and a second pump operating valve 62.

The first pump operating valve 61 and the second pump operating valve 62 are each configured as a pilot-operated valve having a first position 61*a*, 62*a* and a second position 61*b*, 62*b* and are biased by respective springs to the first positions 61*a*, 62*a*.

An oil passage 56 branching from the oil passage 23 is connected to an oil passage 57 of the pump operating unit 36. The oil passage 57 branches off in the pump operating unit 36 such that respective passages branching from the oil passage 57 are connected to the first pump operating valve 61, a pressure receiving section at the second position 61*b* in the first pump operating valve 61, the second pump operating valve 62, and a pressure receiving section at the second position 62*b* in the second pump operating valve 62.

The oil passage 54 (see FIG. 3) is connected to an oil passage 58 of the pump operating unit 36, and the oil passage 58 is connected to the pressure receiving section at the first position 61*a* in the first pump operating valve 61. Among the pilot hydraulic fluids from the control valve unit 20 and the hydraulic units 21, 22, a pilot hydraulic fluid with the highest pressure is supplied to the pressure receiving section at the first position 61*a* in the first pump operating valve 61 via the oil passages 54, 58.

An oil passage 59 is connected to the first pump operating valve 61 and the second pump operating valve 62, and an oil passage 60 is connected to the second pump operating valve 62 and the operating cylinder 35. An oil passage 63 from the first pump operating valve 61 and the second pump operating valve 62 is connected to an oil passage 64, and the oil passage 64 is connected to the transmission case 6.

(Controlled State of Discharge Amount of Hydraulic Pump by Operating Valve and Pump Operating Unit) (1)

The following describes a state where the pilot hydraulic fluid from the control valve unit 20 is assumed to have the highest pressure among the pilot hydraulic fluids from the control valve unit 20 and the hydraulic units 21, 22, and the operating cylinder 35 and the pump operating unit 36 operate by the pilot hydraulic fluid from the control valve unit 20 to control the discharge amount of the hydraulic pump 19.

As illustrated in FIGS. 3 and 4, it is assumed that the lifting control valve 25 and the lowering control valve 26 are operated to the neutral positions 25*b*, 26*b* so that the lift cylinder 16 stops, and the operating valve 30 (the spool 38) is operated to the open position 30*a* with the pressure (the operation pressure) of the pilot hydraulic fluid portion (the portion 37*b* of the sensing oil passage 37) of the control valve unit 20 being low.

When the operating valve 30 (the spool 38) is operated to the open position 30*a*, the notch 45 of the spool 38 is open to the second internal space 42, so that the first port 51 and the second port 52 communicate with each other via the notch 45 of the spool 38, and the sensing oil passage 37 (the portions 37*a*, 37*b*) is open.

As illustrated in FIG. 2, the pressure (operation pressure) of the pilot hydraulic fluid portion (the portion 37*b* of the sensing oil passage 37) of the control valve unit 20 is low, and therefore, the hydraulic oil in the oil passage 57 causes the first pump operating valve 61 to be operated to the second position 61*b* and the second pump operating valve 62 to be operated to the second position 62*b*.

The hydraulic fluid in the oil passage 57 is supplied to the operating cylinder 35 via the second position 61*b* of the first pump operating valve 61, the oil passage 59, the second position 62*b* of the second pump operating valve 62, and the oil passage 60, so that the operating cylinder 35 is operated to the decrease side and the discharge amount of the hydraulic pump 19 is controlled to the decrease side.

(Controlled State of Discharge Amount of Hydraulic Pump by Operating Valve and Pump Operating Unit) (2)

As illustrated in FIGS. 3 and 4, when the lifting control valve 25 is operated to the lifting position 25*a*, the lift cylinder 16 extends, and the pressure (operation pressure) of the pilot hydraulic fluid in the control valve unit 20 increases, the pilot hydraulic fluid in the control valve unit 20 is supplied from the portion 37*b* of the sensing oil passage 37 to the portion 37*a* via the notch 45 of the operating valve 30 (the spool 38).

As illustrated in FIGS. 2, 3 and 4, the pilot hydraulic fluid in the control valve unit 20 is supplied to the pressure receiving section at the first position 61*a* in the first pump operating valve 61 via the oil passages 54, 58, so that the first pump operating valve 61 is operated to the first position 61*a* and the second pump operating valve 62 is operated to the first position 62*a*.

The hydraulic fluid in the operating cylinder 35 is discharged to the transmission case 6 via the oil passage 60, the second pump operating valve 62 (at the first position 62*a*), the oil passage 59, the first pump operating valve 61 (at the first position 61*a*), and the oil passages 63, 64, so that the operating cylinder 35 is operated by the spring 55 to the increase side and the discharge amount of the hydraulic pump 19 is controlled to the increase side.

As described above, as the pressure (operation pressure) of the pilot hydraulic fluid portion (the portion 37*b* of the sensing oil passage 37) in the control valve unit 20 increases, the spool 38 moves leftward in FIG. 5 against the biasing force of the spring 43 due to the pressure (operation pressure) of the pilot hydraulic fluid received by the wall 39*c* of the spool 38 (the first portion 39), as illustrated in FIG. 5, so that the operating valve 30 (the spool 38) is operated to the closed position 30*b*.

Even when the operating valve 30 (the spool 38) is operated to the closed position 30*b*, the pilot hydraulic fluid in the control valve unit 20 is allowed to be supplied to the pressure receiving section at the first position 61*a* in the first pump operating valve 61 by the groove 46 of the operating valve 30 (the spool 38), the communication passages 47, 48, and the check valve 44.

(Controlled State of Discharge Amount of Hydraulic Pump by Operating Valve and Pump Operating Unit) (3)

As illustrated in FIGS. 2, 3 and 5, it is assumed that the pressure (operation pressure) of the pilot hydraulic fluid in the control valve unit 20 slightly decreases while the lifting control valve 25 is operated to the lifting position 25*a*.

When the pressure (operation pressure) of the pilot hydraulic fluid in the control valve unit 20 slightly decreases, even if the pilot hydraulic fluid in the pressure receiving section in the first position 61*a* of the first pump operating valve 61 is to return to the lifting control valve 25 through the sensing oil passage 37, the pilot hydraulic fluid in the control valve unit 20 is stopped at the closed position 30*b* in the operating valve 30 (the spool 38). Hereby, the first pump operating valve 61 is maintained at the first position 61*a*, the second pump operating valve 62 is maintained at the first position 62*a*, and the discharge amount of the hydraulic pump 19 is maintained on the increase side.

With the above configuration, in a case where the load applied to the lift cylinder 16 frequently changes to high and low, even if the pilot hydraulic fluid in the pressure receiving section in the first position 61*a* of the first pump operating valve 61 is to return to the lifting control valve 25 through the sensing oil passage 37, the pilot hydraulic fluid is stopped at the closed position 30*b* of the operating valve 30 (the spool 38). Hereby, the discharge amount of the hydraulic pump 19 is less frequently controlled to increase and decrease by the pump operating unit 36, thereby making it possible to prevent a hunting state.

When the pressure (operation pressure) of the pilot hydraulic fluid in the control valve unit 20 further increases, the pilot hydraulic fluid in the control valve unit 20 is supplied to the pressure receiving section at the first position 61*a* of the first pump operating valve 61 by the groove 46, the communication passages 47, 48, and the check valve 44 of the operating valve 30 (the spool 38), so that the discharge amount of the hydraulic pump 19 is further controlled to the increase side.

(Controlled State of Discharge Amount of Hydraulic Pump by Operating Valve and Pump Operating Unit) (4)

It is assumed that, after the lifting control valve 25 is operated to the lifting position 25*a*, the lifting control valve 25 is operated to the neutral position 25*b*, and the lift cylinder 16 stops.

As illustrated in FIGS. 2, 3 and 5, when the lifting control valve 25 is operated to the neutral position 25*b* and the lift cylinder 16 stops, the pressure (operation pressure) of the pilot hydraulic fluid portion (the portion 37*b* of the sensing oil passage 37) in the control valve unit 20 immediately decreases.

When the pressure (operation pressure) of the pilot hydraulic fluid received by the wall 39*c* of the spool 38 (the first portion 39) decreases as the pressure (operation pressure) of the pilot hydraulic fluid portion (the portion 37*b* of the sensing oil passage 37) in the control valve unit 20 decreases, the spool 38 moves rightward in FIG. 5 due to the biasing force of the spring 43 to operate the operating valve 30 (the spool 38) to the open position 30*a* as illustrated in FIG. 4, so that the portions 37*a*, 37*b* of the sensing oil passage 37 communicate with each other.

Hereby, as illustrated in FIGS. 2, 3 and 4, the pilot hydraulic fluid in the pressure receiving section at the first position 61*a* of the first pump operating valve 61 immediately returns toward the lifting control valve 25 through the sensing oil passage 37 and the operating valve 30 (the open position 30*a*).

The hydraulic oil in the oil passage 57 causes the first pump operating valve 61 to be immediately operated to the second position 61*b* and the second pump operating valve 62 to be immediately operated to the second position 62*b*, and the hydraulic fluid in the oil passage 57 is supplied to the operating cylinder 35 via the second position 61*b* of the first pump operating valve 61, the oil passage 59, the second position 62*b* of the second pump operating valve 62, and the oil passage 60, so that the operating cylinder 35 is operated to the decrease side and the discharge amount of the hydraulic pump 19 is immediately controlled to the decrease side.

With the above configuration, when the lifting control valve 25 is operated to the neutral position 25*b*, the period during which the discharge amount of the hydraulic pump 19 is maintained on the increase side can be shortened, thereby making it possible to save the driving force of the hydraulic pump 19.

(First Modification of Invention)

In FIGS. 2 to 5, one operating valve 30 is provided for one control valve unit 20 (the lifting control valve 25), and the hydraulic units 21, 22 are also provided with respective operating valves 30.

In contrast, the operating valve 30 may be omitted in a plurality of sets of a hydraulic actuator and a control valve, and a pilot hydraulic fluid with the highest pressure may be extracted by the high-pressure selection valve 53 or the like from among pilot hydraulic fluids of the sets of the hydraulic actuator and the control valve, such that the extracted pilot hydraulic fluid with the highest pressure is supplied to one operating valve 30 and then supplied from the operating valve 30 to the pump operating unit 36.

(Second Modification of Invention)

The operating valve 30 (the spool 38) may not include the check valve 44 and the communication passages 47, 48.

In this configuration, the biasing force of the spring 43 may be set to be slightly strong so that the operating valve 30 is maintained at the open position 30*a* just for a little while when the lifting control valve 25 is operated to the lifting position 25*a* as illustrated in FIGS. 2, 3 and 4, in such a manner as to sufficiently supply the pilot hydraulic fluid in the control valve unit 20 to the pressure receiving section at the first position 61*a* of the first pump operating valve 61 via the sensing oil passage 37 and the operating valve 30 (at the open position 30*a*).

(Third Modification of Invention)

Instead of the lift cylinder 16, a hydraulic motor (not illustrated) configured to drive a work device may be provided as the hydraulic actuator.

INDUSTRIAL APPLICABILITY

The present invention is not limited to a hydraulic system for a tractor and is also applicable to a hydraulic system for other farming work vehicles such as a combine, a hydraulic system for a construction work vehicle such as a backhoe or a wheel loader or a transportation work vehicle, or a hydraulic system provided in a device (for example, a lifting-lowering device or the like provided in a factory or a work place) other than the work vehicle.

DESCRIPTION OF REFERENCE NUMERALS

16 lift cylinder (hydraulic actuator)
19 hydraulic pump
25 lifting control valve (control valve)
26 lowering control valve (control valve)
30 operating valve
30*a* open position
30*b* closed position
36 pump operating unit
37 sensing oil passage
37*a* portion
37*b* portion
38 spool
39*a* first land
39*b* second land
39*c* wall (pressure receiving section)
41 first internal space
42 second internal space
42*a* wall (stopper)
43 spring (biasing section)
44 check valve
45 notch
46 groove (communication passage)
47 communication passage
48 communication passage
51 first port
52 second port

The invention claimed is:

1. A hydraulic system, comprising:

a variable displacement hydraulic pump;

a control valve configured to control a supply state of a hydraulic fluid from the hydraulic pump to a hydraulic actuator;

a sensing oil passage configured to extract a pilot hydraulic fluid portion branching from the hydraulic fluid being supplied from the control valve to the hydraulic actuator;

a pump operating unit configured to control a discharge amount of the hydraulic pump to an increase side in response to increasing of a pressure of the pilot hydraulic fluid portion in the sensing oil passage and to control the discharge amount of the hydraulic pump to a decrease side in response to decreasing of the pressure of the pilot hydraulic fluid portion in the sensing oil passage; and an operating valve provided in the sensing oil passage, and wherein:

the operating valve is switchable between an open state allowing the sensing oil passage to be open and a closed state blocking the pilot hydraulic fluid portion from flowing toward the control valve in the sensing oil passage, the operating valve is maintained in the open state while an operation pressure is less than a setting pressure, and the operation pressure is a pressure of the pilot hydraulic fluid portion in a portion of the sensing oil passage which portion is between the operating valve and the control valve, and the operating valve is switched to the closed state in response to increasing of the operation pressure to the setting pressure or more.

2. The hydraulic system according to claim 1, wherein;

the closed state blocks the pilot hydraulic fluid portion from flowing toward the control valve and allows the pilot hydraulic fluid portion to flow toward the pump operating unit.

3. The hydraulic system according to claim 1, wherein:

the operating valve comprises:

a spool movable between an open position causing the open state and a closed position causing the closed state;

a biasing section configured to bias the spool to the open position; and a pressure receiving section configured to receive the operation pressure, wherein the spool is maintained at the open position due to a biasing force of the biasing section while the operation pressure applied to the pressure receiving section is less than the setting pressure, and wherein the spool is operated to the closed position against the biasing force of the biasing section in response to increasing of the operation pressure applied to the pressure receiving section to the setting pressure or more.

4. The hydraulic system according to claim 3, wherein;

the operating valve comprises:

a first internal space;

a second internal space connected to the first internal space;

a first port allowing the first internal space to communicate with a portion of the sensing oil passage which portion is adjacent to the pump operating unit;

a second port allowing the second internal space to communicate with a portion of the sensing oil passage which portion is adjacent to the control valve;

the spool comprising a first land disposed on a side opposite from the second port across the first port, a second land disposed closer to the second port than the first port, and a notch provided in a peripheral end of the second land which peripheral end is adjacent the first land, the spool supported movably in the first internal space;

a communication passage provided in the spool separately from the second land and the notch and allowing the first port to communicate with the second port; and a check valve configured to block the pilot hydraulic fluid portion from flowing from the first port to the second port in the communication passage and to allow the pilot hydraulic fluid portion to flow from the second port to the first port in the communication passage, and wherein:

the pressure receiving section is a portion of the second land which portion faces the second internal space, the spool moves due to the biasing force of the biasing section to the open position allowing the first port to communicate with the second port via the notch, in response to decreasing of the operation pressure applied to the pressure receiving section to be less than the setting pressure, with the first land and the second land being-supported in the first internal space, and the spool moves against the biasing force of the biasing section to the closed position causing the second land to block the communication between the first port and the second port via the notch, in response to increasing of the operation pressure applied to the pressure receiving section to the setting pressure or more, with the first land and the second land being-supported in the first internal space.

5. The hydraulic system according to claim 4, further comprising:

a stopper configured to, in response to the spool moving to the open position due to the biasing force of the biasing section, stop the spool at a position allowing the first port to communicate with the second port via the notch and maintaining the second land in the first internal space.

6. The hydraulic system according to claim 4, wherein:

the second internal space has a diameter larger than a diameter of the first internal space.

* * * * *